(12) United States Patent
Du et al.

(10) Patent No.: US 10,696,599 B2
(45) Date of Patent: Jun. 30, 2020

(54) SHAPE MEMORY CERAMIC PARTICLES AND STRUCTURES FORMED THEREOF

(71) Applicants: Massachusetts Institute of Technology, Cambridge, MA (US); Nanyang Technological University, Singapore (SG)

(72) Inventors: Zehui Du, Singapore (SG); Hang Yu, Blacksburg, VA (US); Christopher A. Schuh, Wayland, MA (US); Chee Lip Gan, Singapore (SG)

(73) Assignees: Massachusetts Institute of Technology, Cambridge, MA (US); Nanyang Technological University, Singapore (SG)

(*) Notice: Subject to any disclaimer, the term of this patent is extended or adjusted under 35 U.S.C. 154(b) by 0 days.

(21) Appl. No.: 16/075,350

(22) PCT Filed: Feb. 10, 2017

(86) PCT No.: PCT/US2017/017561
§ 371 (c)(1),
(2) Date: Aug. 3, 2018

(87) PCT Pub. No.: WO2017/139706
PCT Pub. Date: Aug. 17, 2017

(65) Prior Publication Data
US 2019/0039959 A1    Feb. 7, 2019

Related U.S. Application Data

(60) Provisional application No. 62/294,402, filed on Feb. 12, 2016.

(51) Int. Cl.
*C04B 35/63* (2006.01)
*C04B 35/634* (2006.01)
(Continued)

(52) U.S. Cl.
CPC ...... *C04B 35/63416* (2013.01); *C01F 17/206* (2020.01); *C01G 25/02* (2013.01);
(Continued)

(58) Field of Classification Search
CPC ..... C04B 35/447; C04B 35/486; C04B 35/48; C04B 35/119; C04B 35/484
See application file for complete search history.

(56) References Cited

U.S. PATENT DOCUMENTS

| 4,767,730 A | 8/1988 | Soma et al. | |
|---|---|---|---|
| 7,642,210 B2 * | 1/2010 | Okamoto | B01D 53/885 423/608 |

(Continued)

OTHER PUBLICATIONS

PCT/US2017/017561, International Search Report, First Sheet, Second Sheet, Continuation of Second Sheet, and Patent Family Annex, May 2017.
(Continued)

*Primary Examiner* — Noah S Wiese
(74) *Attorney, Agent, or Firm* — Theresa Lober

(57) ABSTRACT

There is provided a shape memory ceramic structure including an aggregate population of crystalline particles. Each crystalline particle in the population, of crystalline particles comprises a shape memory ceramic particle material. Each crystalline particle in the population of crystalline particles has a crystalline particle extent that is between about 0.5 microns and about fifty microns. At least a portion of the population of crystalline particles has a crystalline structure that is either oligocrystalline or monocrystalline.

27 Claims, 7 Drawing Sheets

(51) Int. Cl.
    C01G 25/02      (2006.01)
    C04B 35/486     (2006.01)
    C04B 35/626     (2006.01)
    C01F 17/206     (2020.01)
(52) U.S. Cl.
    CPC ........ *C04B 35/486* (2013.01); *C04B 35/6263* (2013.01); *C04B 35/62655* (2013.01); *C04B 35/62675* (2013.01); *C01P 2004/61* (2013.01); *C04B 2235/3229* (2013.01); *C04B 2235/528* (2013.01); *C04B 2235/5296* (2013.01); *C04B 2235/5436* (2013.01)

(56) References Cited

U.S. PATENT DOCUMENTS

| | | |
|---|---|---|
| 8,282,746 B2 | 10/2012 | Schuh et al. |
| 9,018,117 B2 | 4/2015 | Schuh et al. |
| 9,091,314 B2 | 7/2015 | Schuh et al. |
| 9,512,039 B2 | 12/2016 | Schuh et al. |
| 10,167,540 B2 | 1/2019 | Tuncer et al. |
| 10,214,798 B2 | 2/2019 | Schuh et al. |
| 2011/0300358 A1* | 12/2011 | Blohowiak ............... B32B 5/12 428/215 |
| 2014/0255693 A1* | 9/2014 | Schuh ..................... C04B 35/50 428/401 |

OTHER PUBLICATIONS

PCT/US2017/017561, IPRP, Form PCT/IB/373, Written Opinion of the ISA, Cover Sheet, Box No. 1 Sheet, Box No. 2 Sheet, Box No. V Sheet, Box No. VII Sheet, Box No. VIII Sheet, Form PCT/ISA/237, 5 Supplemental Box Sheets, Aug. 2018.

Winterer et al., "Phase Stability in Nanostructured and Coarse Grained Zirconia at High Pressures," Nanostructureo Materials, vol. 5, No. 6, pp. 679-688, 1995.
Carne-Sanchez et al., "A spray-drying strategy for synthesis of nanoscale metal-organic frameworks and their assembly into hollow superstructures," Nature Chemistry, vol. 5, pp. 203-211, Mar. 2013.
Vargas-Gonzalez, "Microstructural optimization of solid-state sintered silicon carbide," Georgia Institute of Technology Thesis for the degree of Doctor of Philosophy, pp. i-xii and 1-105, Aug. 2009.
Du et al., "Size effects and shape memory properties in ZrO2 ceramic micro- and nano-pillars," Scripta Materialia, vol. 101, pp. 40-43, Feb. 2015.
Du et al., "Superelasticity in micro-scale shape memory ceramic particles," Acta Materialia, vol. 123, pp. 255-263, Oct. 2016.
Singapore Patent Application No. 11201806162S, Transmittal Letter and Request for Examination Report, pp. 1-5, Singapore Patents Act Form 13, pp. 1-3, Marked-up amended claim listing, pp. 34-38, Clean amended claim listing, pp. 34-38, Feb. 2019.
Zeng et al., "Enhanced shape memory and superelasticity in small-volume ceramics: a perspective on the controlling factors," MRS Communications, vol. 7, Issue 4, pp. 747-754, Dec. 2017.
Zeng et al., "In-situ studies on martensitic transformation and high-temperature shape memory in small volume zirconia," Acta Materialia, vol. 134, pp. 257-266, Jun. 2017.
Zhao et al., "Shape memory zirconia foams through ice templating," Scripta Materialia, vol. 135, pp. 50-53, Mar. 2017.
Zeng et al., "Microstructure, crystallizaiton and shape memory behavior of titania and yttria co-doped zirconia," Jnl. of the European Ceramic Society, vol. 36, Issue 5, pp. 1277-1283, Apr. 2016.
Lai et al., "Shape Memory and Superelastic Ceramics at Small Scales," Science, vol. 341, pp. 1505-1508, Sep. 2013.

\* cited by examiner

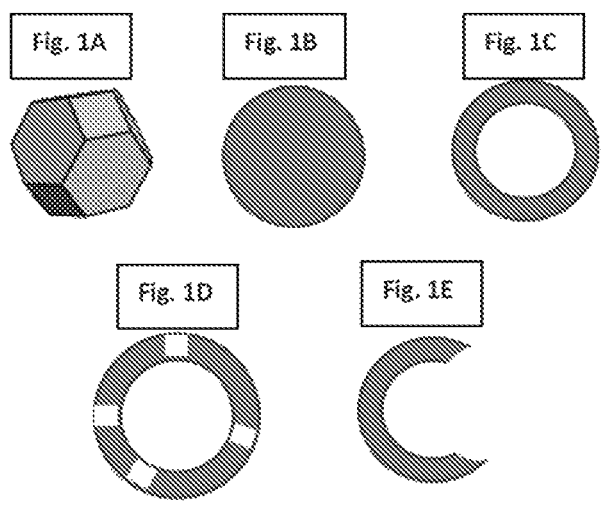
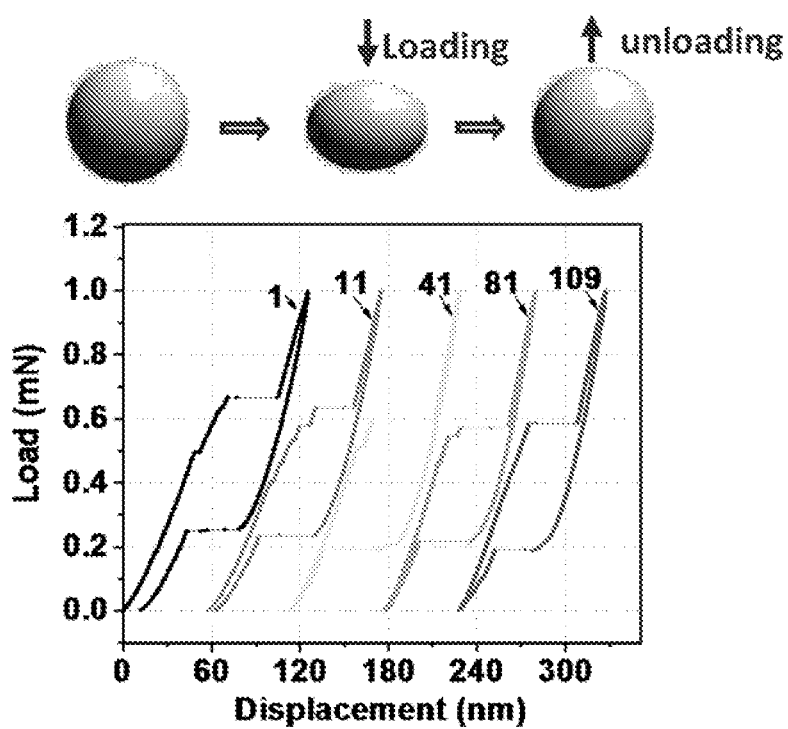

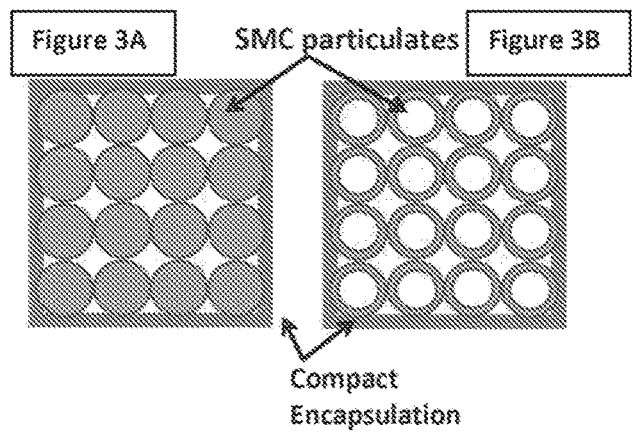
Figure 3A | SMC particulates | Figure 3B
Compact Encapsulation
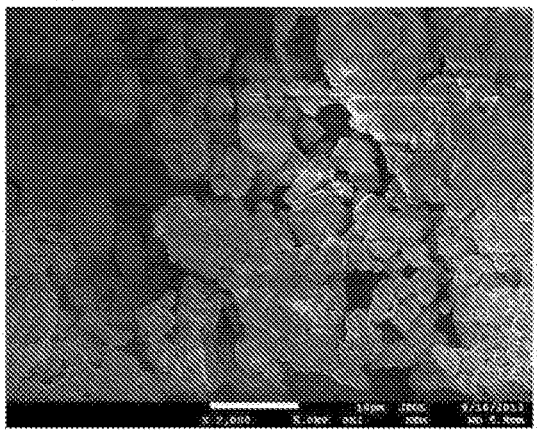
FIGURE 4A
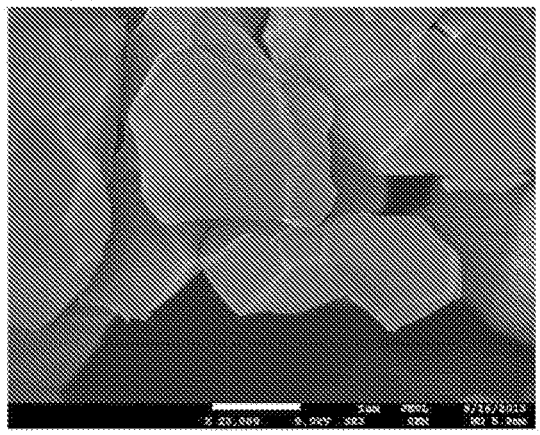
FIGURE 4B
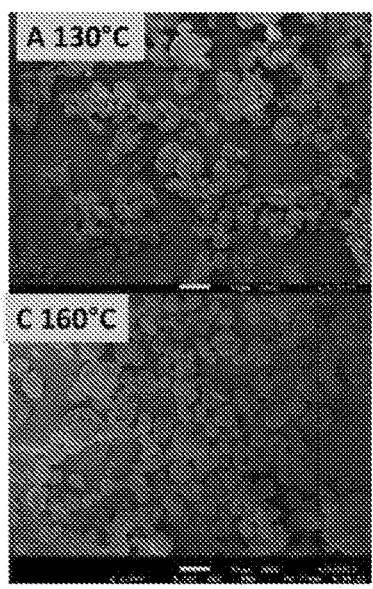
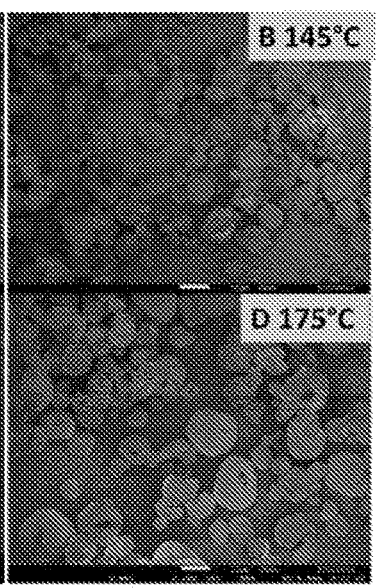
FIGURE 5A — A 130°C
FIGURE 5B — B 145°C
FIGURE 5C — C 160°C
FIGURE 5D — D 175°C

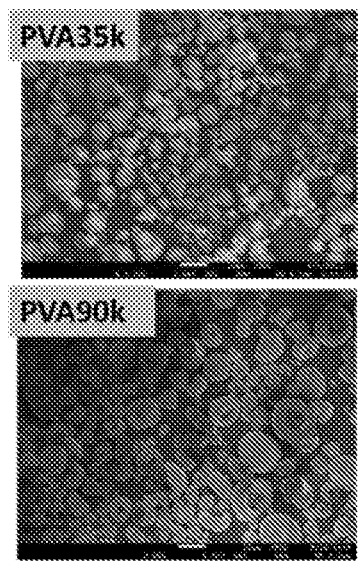
FIGURE 6A
FIGURE 6C
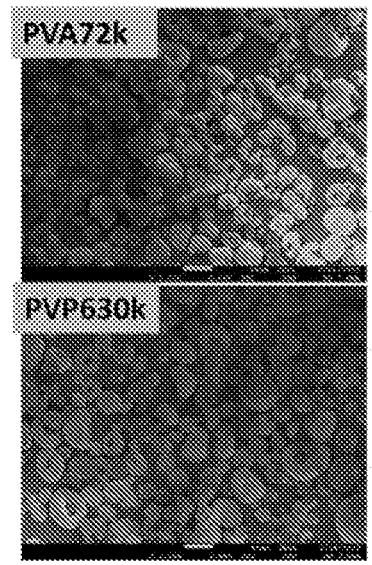
FIGURE 6B
FIGURE 6D
FIGURE 7A      FIGURE 7B      FIGURE 7C
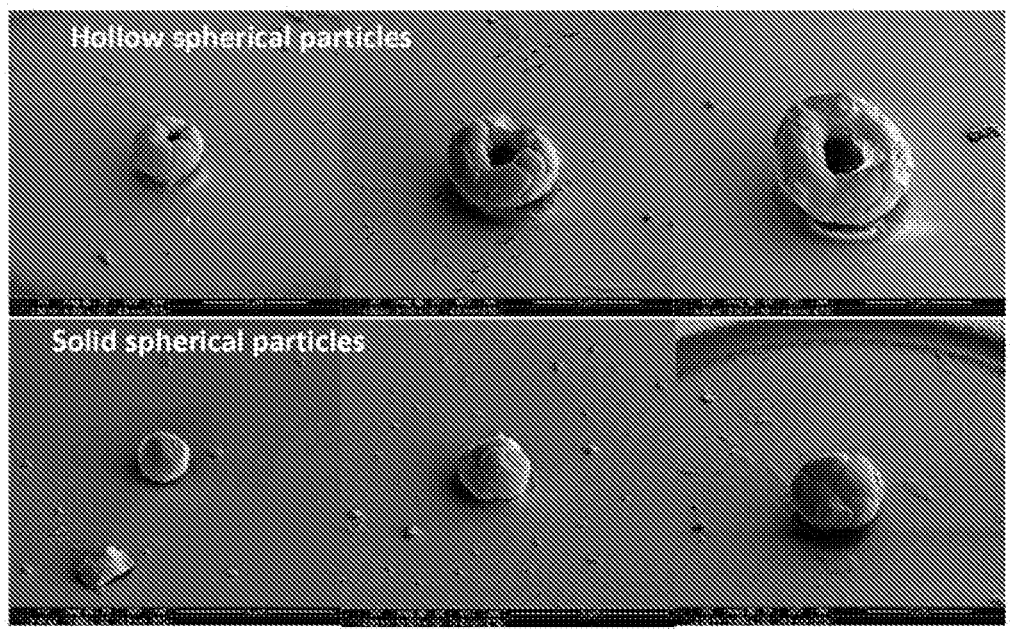
FIGURE 7D      FIGURE 7E      FIGURE 7F FIGURE 8A
FIGURE 8B
FIGURE 8C
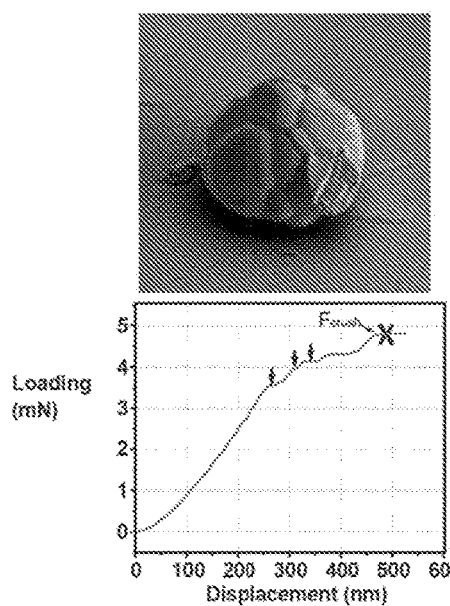
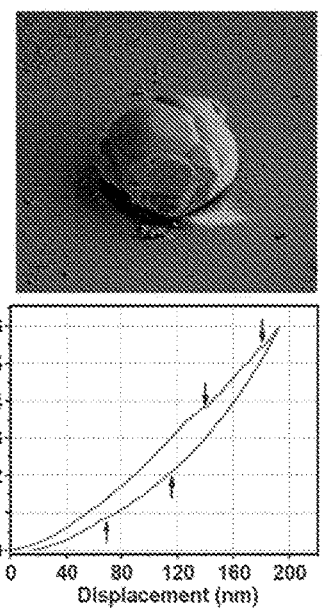
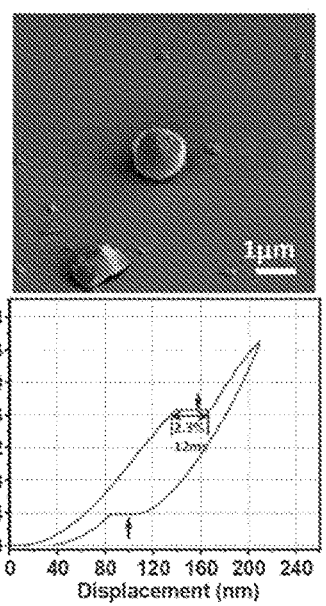
FIGURE 8D
FIGURE 8E
FIGURE 8F
FIGURE 9A
FIGURE 9B
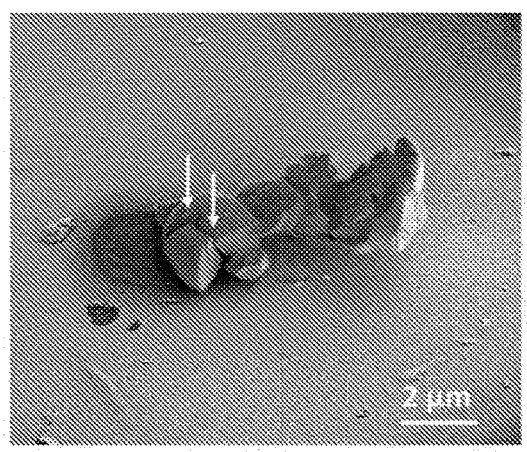
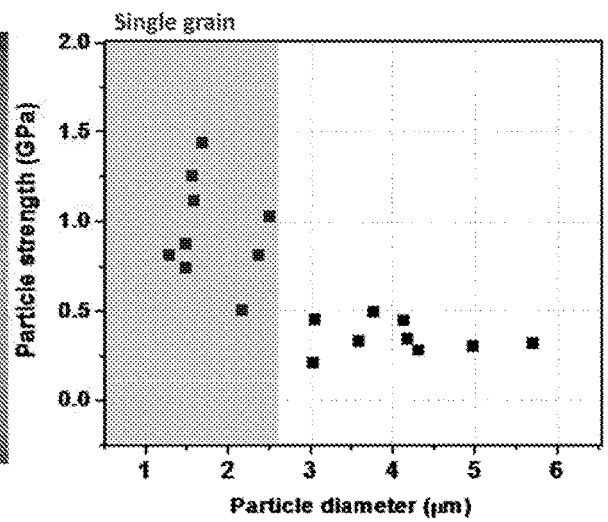

SHAPE MEMORY CERAMIC PARTICLES AND STRUCTURES FORMED THEREOF

CROSS-REFERENCE TO RELATED APPLICATIONS

This application claims the benefit of U.S. Provisional Application No. 62/294,402, filed Feb. 12, 2016, the entirety of which is hereby incorporated by reference.

BACKGROUND

This invention relates generally to shape memory materials, and more particularly relates to ceramic shape memory materials.

Ceramic shape memory materials, or shape memory ceramics (SMC) are ceramic compounds that can change their shape by application of a load to the ceramic material, and that can subsequently return to their original shape by either heating or unloading of the ceramic material. The so-called shape memory effect refers to a cycle of load application and heating for cyclic shape change, while the characteristic of superelasticity refers to the cycle of loading and unloading for cyclic shape change. The physical mechanism underlying both of these cyclic Shape changes is related to a thermoelastic martensitic transformation between two crystallographic phases. The most widely employed shape memory materials are metals, and in particular metal alloys. Shape memory alloys (SMAs) are well-known for their ability to transform between the martensitic and austenitic crystallographic phases. But conventional SMA structures are characterized by relatively low transformation stresses and correspondingly low energy dissipation capabilities. In contrast, some ceramic shape memory materials have been shown to be capable of exhibiting reversible martensitic transformation with high stresses, offering the prospect of improved energy dissipation over that of conventional SMAs and the ability to particularly address applications in, e.g., actuation, energy harvesting, and mechanical energy damping.

For example, the family of zirconia-based shape memory ceramics has been well-studied for applications in sensing, actuation, and mechanical energy damping. Zirconia exhibits a reversible thermoelastic transformation between a high-temperature tetragonal phase, referred to as austenite, and a low-temperature monoclinic phase, referred to as martensite, with associated shear strains of up to 15%. This strain can be fully recovered by release of an applied stress that induced the strain, to cause a reverse martensitic transformation, as a result of the superelastic capability of zirconia.

It is found that for many shape memory ceramics like zirconia, the martensitic transformation and its associated shape change generally leads to substantial internal stresses. As a result, many shape memory ceramics, which are in general brittle materials, have a tendency to fracture or crack during martensitic transformation. For example, at strains of only about 1%-2%, cracking occurs in polycrystalline zirconia after only a few transformation cycles. This cracking originates from the large mismatch stress that accumulates in neighboring crystalline grains, which have differing crystal orientations, during a martensitic transformation. Thus, although ceramic materials can in principle exhibit superior shape memory and superelastic properties with useful transformation shape recovery, such was not in general historically achievable due to the inherent brittle nature of such ceramic materials.

It has been proposed to mitigate the condition of shape memory ceramic material cracking by employing small-volume ceramic structures that include only a few crystalline grains within. Such a ceramic structure has a large free surface area and little grain boundaries. This enables relaxation of transformation stress in the structure and hence minimization of the formation of inter-granular fractures during martensitic transformation, leading to a robust shape memory ceramic structure capable of many superelastic cycles with large strains. The combination of high strength, large recoverable strain, large energy damping, and light weight that such structures exhibit are interesting for many challenging applications, particularly in energy damping and absorption.

But such ceramic structures generally are not in a geometric form that can be employed in many engineering applications, particularly large-scale engineering applications. Further, the production of such micro-scale ceramic structures is not in general amenable to large-volume production methods. As a result, the challenge of successful integration of shape memory ceramic materials into many energy-damping systems remains unmet.

SUMMARY

There is provided herein a shape memory ceramic structure that includes an aggregate population of crystalline particles. Each crystalline particle in the population of crystalline particles comprises a shape memory ceramic particle material. Each crystalline particle in the population of crystalline particles has a crystalline particle extent that is between about 0.5 microns and about fifty microns. At least a portion of the population of crystalline particles has a crystalline structure that is either oligocrystalline or monocrystalline.

The population of crystalline particles can be produced by solid state sintering and spray drying methods that overcome the limitations of conventional particle production methods and are scalable and cost-effective. With this fabrication methodology, the shape memory ceramic particles can be integrated into a wide range of energy-damping and shock absorbing systems, e.g., for armor, automobiles, sports equipment, and aerospace applications.

Other features and advantages of the invention will be apparent from the following description and accompanying figures, and from the claims.

BRIEF DESCRIPTION OF THE DRAWINGS

FIGS. 1A-1E show a perspective view of a polyhedral shape memory ceramic particle, a cross sectional view of a solid spherical shape memory ceramic particle, a cross sectional view of a hollow spherical shape memory ceramic particle having a shell, a cross sectional view of a hollow spherical shape memory ceramic particle with pores in the shell, and a cross sectional view of a hollow spherical shape memory ceramic particle including one side opening out of the shell, respectively;

FIG. 2A is a schematic of a spherical shape memory ceramic particle subjected to loading and unloading;

FIG. 2B is a plot of load and displacement cycles exhibited by loading and unloading of a spherical shape memory ceramic particle like that of FIG. 2A;

FIGS. 3A-3B are cross-sectional schematic views of a population of solid shape memory ceramic particles and hollow shape memory ceramic particles, respectively, arranged in a three-dimensional cubic compact shape with a fabric or coating surrounding the compact;

FIGS. 4A-4B are micrographs of single crystal 8 mol % Ce—ZrO$_2$ powders modified with phenolic polymer microspheres and prepared by a solid state sintering method;

FIGS. 5A-5D are micrographs of spray dried ceramic particles produced by spray drying and including the binder PVA35k, at a spray drying temperature of 130° C., 145° C., 160° C., and 175° C., respectively;

FIGS. 6A-6D are micrographs of dried ceramic particles produced by spray drying at a temperature of 160° C., and including the binders PVA35k, PVA72k, PVA90k, and PVP630k;

FIGS. 7A-7C are micrographs of hollow spray dried ceramic particles of increasing diameter;

FIGS. 7D-7F are micrographs of solid spray dried ceramic particles of increasing diameter;

FIGS. 8A-8C are micrographs of zirconia particles that underwent experimental loading cycles;

FIGS. 8D-8F are plots of the load displacement characteristics for the tested zirconia particles of FIGS. 8A-8C;

FIG. 9A is a micrograph of the particle of FIG. 8A after crushing;

FIG. 9B is a plot of particle strength as a function of particle diameter for a population of shape memory ceramic particles;

FIG. 11C is a plot of dissipated energy as function of number of loading cycles far the particle of the plot of FIG. 11A, as a function of number of loading cycles;

FIG. 11D is a plot of force per displacement during loading and unloading for the particle of the plot of FIG. 11A, as a function of number of loading cycles;

DETAILED DESCRIPTION

Figure 10A:
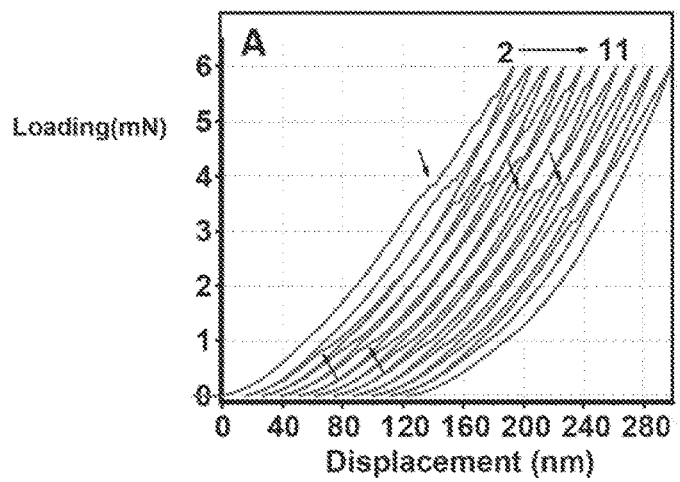
FIG. 10A is a plot of the load displacement characteristic for the particle of FIG. 8B.

FIGS. 1A-1E show schematic views of example geometries for shape memory ceramic (SMC) particles provided herein. The shape memory ceramic particle is crystalline and can be single crystalline, that is, monocrystalline, being formed of a single crystal of ceramic shape memory material. The shape memory ceramic particle can alternatively be oligocrystalline or can be polycrystalline, including more than one grain of ceramic shape memory material, preferably including no more than about ten grains, or preferably no more than about 5 grains, or more preferably no more than about 3 grains of ceramic shape memory material. An oligocrystalline ceramic particle is herein defined as a particle of polycrystalline ceramic morphology in which the total surface area of the particle is greater than the total area of the polycrystalline grain boundaries within the ceramic particle. This condition results in the grains of the ceramic material structure being coordinated predominantly by unconfined free surfaces rather than by rigid boundaries with other grains within the structure, as explained in U.S. Pat. No. 9,512,039, issued Dec. 6, 2010, the entirety of which is hereby incorporated by reference.

Whatever morphology, the shape memory ceramic particle can be solid or can be hollow. A hollow particle can have a closed surface that is a closed shell, or can have a surface shell that includes one or more openings. For example, a hollow particle shell can have a pore or pores, and such pores can open on one side of the shell or all around the shell. Hollow particles can also have a shell that varies in wall thickness.

The shape, memory ceramic particles can be of any regular geometric shape or of any irregular geometric shapes. Example ceramic shape memory particle shapes include spherical, polyhedral, cylindrical, discoidal, tabular, ellipsoidal, equant, and other suitable shapes. Preferred ceramic shape memory particle shapes include polyhedral, equant, Spherical, hollow spherical, and hollow spherical with pores opening on one side or all around the outer shell as shown in FIGS. 1A-E. FIG. 1A shows a perspective view of an example polyhedral shape memory ceramic particle; FIG. 1B shows a cross section of a solid spherical shape memory ceramic particle; FIG. 1C shows a cross section of a hollow spherical shape memory ceramic particle having a shell; FIG. 1D shows a cross section of a hollow spherical shape memory ceramic particle with pores in the shell; and FIG. 1E shows a hollow spherical shape memory ceramic particle including one side opening out of the shell. These example shape memory ceramic particle geometries are not meant to be limiting but to demonstrate example features of the shape memory ceramic particles provided herein.

It is recognized herein that during cyclic martensitic transformation, an internal stress field is produced within a shape memory ceramic particle. The more homogeneous the internal stress field within the particle, the less likelihood of fracture or cracking of the particle during martensitic transformation. The less homogeneous the internal stress field, i.e., the less evenly the stress is distributed across the particle, the more likely the particle is to crack or fracture. It therefore can be preferred for some applications to employ a shape memory ceramic particle geometry that is substantially regular. For example, a particle geometry in which two feces are parallel to each other, such as cubic, cuboid, tetragonal and trapezoidal geometric shapes can be preferred. Alternatively, for some applications, it can be preferred to employ a ceramic shape memory particle geometry that is spherical or that is regular and a symmetric polyhedral, meaning equiangular, equilateral or convex. The geometry of the shape memory ceramic particle is not limited, but for various applications, there can be selected a most-suitable geometry that minimizes the likelihood of fracture or cracking.

The diameter of a shape memory ceramic particle that is spherical, the length of each side of a non-spherical shape memory ceramic particle, e.g., a polyhedral ceramic shape memory particle, and the shell thickness of a hollow ceramic shape memory particle, are all preferably between about 0.01-100 times the average grain size that is exhibited by a polycrystalline ceramic shape memory material to be employed for the particle. For many applications it can be preferred that these dimensions, e.g., sphere diameter, be no more than 10 times the average material grain size. For example, if the characteristic grain size of a selected shape memory ceramic material is 1 µm, then the diameter of a particle of the material is preferably about 10 µm or less. For many applications, the optimal ceramic particle size range for demonstrating superior superelasticity can be between about 0.5 µm and about 50 µm. For many applications, the preferred ceramic particle size is between about 1 µm and about 10 µm, and for many applications, the preferred ceramic particle size is no more than about 5 µm.

The superelastic SMC particles include at least one ceramic material that can exhibit a reversible martensitic transformation, i.e., that is a shape memory ceramic material. Preferably, the austenite finishing temperature ($A_f$) of the ceramic material is close to or lower than the temperature at which particles of the material are to be employed in operation so that the ceramic particles can undergo stress-induced superelasticity at reasonable temperatures. Example shape memory ceramic particle materials to be employed herein include $Al_2SiO_5$, $Ca_2SiO_4$, $Mg_2SiO_4$, $Mg_2SiO_4$, and $ZrO_2$ which can be doped with Ce, Y, Ca, Mg, Ti, Ge, La, Pb, Nb, Ta, or Mn, or co-doped with two or more of the elements mentioned above. For example, $ZrO_2$ can be doped with ceria with a Ce dopant concentration>=12 mol % or doped with yttria with a dopant concentration>=3 mol %. $ZrO_2$ can be also be co-doped with ceria, e.g., with a Ce dopant concentration>=8 mol % and with a dopant concentration of yttria of 0.5 mol %, or co-doped with yttria with a dopant concentration>=3 mol % and with a dopant concentration of titania of 5 mol %. These example doping scenarios can be employed where preferred for a given application and are not meant to be limiting. All of these ceramic particle materials exhibit a pure tetragonal phase at room temperature and hence their austenite finishing temperature is close to or slightly lower than room temperature of 25° C. As a result, these materials are particularly well-suited as ceramic particle materials for energy damping and energy absorbance shape memory applications at temperatures at room temperature or higher than room temperature.

The shape memory ceramic particles can be employed in any suitable fashion in which they can interact with an environment to undergo cyclic martensitic transformation. An aggregate population of the shape memory ceramic particles, whether loose or compacted, can be arranged as a shape memory ceramic structure. An aggregate population forming a structure of loose particles can be employed, e.g., as contained in a vessel, arranged as a coating on a surface, or in other suitable arrangement. In general, any suitable arrangement can be employed ill which an aggregate population of shape memory ceramic particles can be exposed to an environment that enables martensitic transformation of the ceramic particle material. Referring to FIGS. 2A-2B, with an SMC particle arranged for interaction with an environment as-disposed in any selected shape and configuration, the mechanical loading and unloading of the particle can be conducted through many cycles, such as more than 100 cycles, with the particle demonstrating cyclic displacement through the entire sequence of 100 cycles.

In one embodiment, there is thrilled a solid state shape memory ceramic structure as an aggregate population of shape memory ceramic particles. The bulk form structure can be encapsulated in any suitable layer or configuration if desired. FIG. 3A schematically shows a cross-sectional side view of a cubic compact of an aggregate population of solid shape memory ceramic particles having an encapsulation layer provided at the outer extent of the cubic compact. FIG. 3B schematically shows a cross-sectional side view of a cubic compact of an aggregate population of hollow shell-shape memory ceramic particles having an encapsulation layer provided at the outer extent of the cubic compact. The particle compact can be of any geometry that is suitable for a given application, including one or more cylindrical plates, rectangular or cubic plates, or other structures, e.g., like that represented in FIG. 3A-3B.

Whatever shape of compact of the aggregate particle population is employed, the population of compacted particles can include many different and random particle shapes, e.g. some particles as spheres, some as polyhedrals, and some as irregularly-shaped particles. Preferably, the majority of the population of the particles are either spherical or hollow spherical in shape or are a regular polyhedral shape. The size distribution of particles in the population of compacted particles can be any suitable distribution, for example, between about 0.5 µm and about 50 µm in size. The preferred particle size is between about 1 µm and about 10 µm, more preferably no more than 5 µm. The preferred particle size distribution can be monodisperse or polydisperse with the particle size variation in the range of 1-100 times the smallest particle size. In many embodiments, it is preferred that a least a portion of the population of the aggregate particle population be monocrystalline or oligocrystalline, to exploit the superior shape memory properties of monocrystalline and oligocrystalline shape memory ceramic particles, as explained below.

Any suitable process can be employed to the shape memory ceramic particles provided herein. In one example, to produce polyhedral SMC single crystal particles, there can be employed a modified solid-state sintering method in which polymers containing rich aromatic rings, and preferably six-membered aromatic rings, are used to separate grains of the ceramic particle powder material during a sintering step. The polymers containing rich aromatic rings can be, e.g., polystyrene (PS), acrylonitrile butadiene Styrene (ABS), styrene acrylonitrile (SAN), styrene-isoprene-styrene (SIS), poly(styrene-butadiene-styrene (SBS), poly (styrene-ethylene/butylene-styrene) (SEBS), and various other styrene copolymers, polybutadiene, polyisoprene, polyethylene-butylene, phenolic resins, phenol formaldehyde resins and various other phenolic copolymers, epoxy resins, nylon, polyurethane and their copolymers and the like. Polymers with hollow structures are preferred. The polymers preferably have a particle size of between about 0.5 µm and about 100 µm and polymer particles smaller than 20 µm are preferred. The weight percentage of the polymers to the ceramic powder precursors is in one example between about 1 wt % and about 15 wt %.

In one example of a modified solid state sintering process, Ce doped zirconia particles are produced with 16 mol % Ce-doping of $ZrO_2$ particles. First, commercially available $ZrO_2$ and $CeO_2$ powders are mixed by a standard ball milling method, with ethanol as the milling media. After ball milling for about 24 hours, the powders are dried and ground.

Subsequently, a selected polymer powder, e.g. phenolic hollow microspheres with size range of between about 5 µm and about 50 µm are added into the ceramic powder mixture and mixed for at least about 2 hours.

The mixed powders are then sintered at a temperature of between about 1000° C. and about 1600° C. for a duration of between about 1 hour and about 20 hours. The sintering temperature and sintering duration together set the grain size of the ceramic particles that results from the sintering process. For example, at a sintering temperature of 1500° C. and a sintering duration of 2 hours, the resulting powder grain size is between about 0.5 µm and about 2 µm. The grain size increases to between about 1 µm and about 4 µm when the sintering time is extended to 20 hours. The grain size is between about 4 µm and about 7 µm after sintering at a temperature of about 1600° C. for 8 hours, and the grain size of the powder is between about 7 µm and about 10 µm for a sintering temperature of 1700° C. and a sintering duration of 4 hours.

For any sintering temperature and duration, it can be preferred to ramp the starting temperature up to the selected sintering temperature, e.g., at a ramp rate of between about 5° C./min and about 20° C./min. A ramp rate of at least about 5° C./min can be preferred because higher ramp rates shift the carbonization and decomposition of the polymers to higher temperatures. FIGS. 4A-B show polyhedral SMC Ce—$ZrO_2$ particles prepared using phenolic hollow microspheres as modifiers. For this case, the weight percentage of the phenolic microspheres to the $ZrO_2$ and $CeO_2$ powder mixture is about 8 wt % and the sintering conditions include a sintering temperature of 1500° C. and a sintering duration of 4 hours. At the completion of the sintering process, the ceramic particles remain loose and ready to be configured and operated in an energy damping application. The powders do not need to be employed as a loose population, and instead can be arranged in a bulk aggregation, and can be compressed to a desired density by applying a confined load as explained below.

Superelastic SMC particles as provided herein and having solid spherical or hollow spherical shapes can also be produced by spray drying according to methods provided herein. This spray drying process transforms an aqueous slurry into dry, generally spherical ceramic particles, also herein termed powder, by spraying the slurry into a hot drying medium. Although spray drying methods have been used to prepare ceramic spherical particles for more than twenty years, the particle sizes of these conventional processes are generally not well controlled. Most of the particles in a conventional spray drying process have a size range of between about 50 µm and about 150 µm, and the particles tend to be agglomerated after sintering. In contrast, in the methodology provided herein, by careful tuning of the spray drying conditions and conditions of a subsequent sintering process, there can successfully be produced hollow or solid SMC spherical particles with a size that is less than 10 µm and that includes one single grain, as a monocrystalline particle, or only a few grains, in an oligocrystalline arrangement of the particle.

Considering a 16 mol % Ce-doped $ZrO_2$ ceramic system as an example to demonstrate the spray drying process, in a first step, a hinder such as polyvinyl alcohol (PVA) with molecular weight of between about 10,000 and about 90,000, and preferably about 35,000, polyvinylpyrrolidone (PVP) with molecular weight of between about 10,000 and about 130,000, cellulose, polyethylene glycol (PEG), or polyacrylate is dissolved in hot water at a temperature of, e.g., between about 70° C. and about 90° C. After cooling down following dissolving, a suitable dispersant, such as a commercial dispersant like Dolerpix Ce 64 and Darvan C—N, Zschimmer & Schwarz GmbH, Lahnstein, G E, is added, and then selected ceramic powders, e.g., commercially available ceramic powders $ZrO_2$ and $CeO_2$ are added. The aqueous slurry is then mixed by, e.g., ball milling, for at least 24 hours. The obtained slurry can consist of, e.g., between about 1 wt % and about 5 wt % of the binders such as PVA PVP, between about 0.25 wt % and about 5 wt % Darvan C—N, about 20 wt % and 60 wt % ceramic powder, with the rest being water.

A spray dryer, such as a commercially-available dryer like Büchi Mini Spray Dryer B-290, Büchi Corp., New Castle, Del., with the nozzle tip of selected size, e.g., a diameter of 0.7 mm, is then employed. To generate hollow spherical particles, coaxial nozzles can be used. Other commercial or custom spray dryer systems can also be used. Example preferred conditions for spray drying to produce shape memory ceramic particles are as follows: 1) The spray air pressure is preferably about 100 Psi; 2) The spray inlet temperature is preferably between about 130° C. and about 160° C.; 3) The feed rate is preferably about 30 ml/hr; 4) The pump is set at about 10%; and 5) The aspirator is set at about 100%.

FIGS. 5A-D show spherical ceramic particles produced by spray drying at different spray dryer inlet temperatures. With the spray dryer inlet temperature set at a temperature of between about 130° C. and about 160° C. the resulting ceramic powder particle diameter is between about 0.5 µm and about 10 µm and the majority of the particles have a diameter smaller than about 5 µm, as shown in FIGS. 5A-5C. When the spray dryer inlet temperature is increased to 175° C., the ceramic particle diameter significantly increases, reaching a diameter of between about 5 µm and about 20 µm, as shown in FIG. 5D.

FIGS. 6A-D show spherical ceramic particles produced by spray drying at a spray dryer inlet temperature of 160° C. and produced with slurries including the binders PVA35k, PVA72k, PVA90k and PVP630k, respectively. These micrographs show that the ceramic particle diameter is between about 0.5 µm and about 10 µm when using PVA35k (Mw=35,000) as a binder. With the molecular weight of the binder increased to 72,000 (PVA72k) and then to 90,000 (PVA90k), the ceramic particle diameter is found to increase to between about 1 µm and about 30 µm and a majority population of the particles has a diameter as big as about 10 µm. The particle size of ceramic particles prepared with PVP630k is shown to be close to that of ceramic particles prepared with PVA90k.

Because the grain size of the ceramic particles is in general a few micrometers, ceramic particles having a diameter greater than about 5 µm are usually polycrystalline, and consist of a plurality of grains. In polycrystalline ceramic particles having a diameter greater than about 5 µm, superelasticity can be restricted due to relatively less free surface area as well as relatively more constraint from grain boundaries. Polycrystalline particles having a diameter greater about 5 µm therefore can tend to crack or even be crushed before the occurrence of martensitic transformation and the corresponding superelastic behavior that is desired. With this recognition, it can be preferred in the spray drying process provided herein to employ a spray dryer inlet temperature of between about 130° C. and 160° C. and to employ PVA35k as a binder to obtain a majority of a population of ceramic spherical particles with a diameter less than about 5 µm. This condition of a ceramic particle population majority having a diameter less than about 5 µm results in the achievement of superelastic properties in the ceramic particle population majority.

After spray drying, the spray-dried ceramic particles can be sintered at a temperature of between about 500° C. and about 1300° C. for about 2 hours to burn off the polymer binders and dispersants, if necessary, and can be sintered at a temperature of between about 1300° C. and about 1700° C. for 2-8 hours to cause the ceramic particles to crystallize and to cause grain growth within the particles. Long-duration sintering, for more than 8 hours, is not recommended as the particles can then become agglomerated. This two-step sintering process enables production of superior shape memory ceramic particles. FIGS. 7A-7F show example spherical ceramic particles resulting after spray drying and sintering and having different diameters. The ceramic particles can be hollow or solid, and can be doughnut-shaped or nearly spherical shaped, i.e., not perfectly spherical. The term "spherical" is herein meant to refer to a ceramic particle geometry that is not necessarily perfectly spherical, but is generally spherical. Depending on the ceramic particle diameter, ceramic particles consisting of one grain, i.e., monocrystalline, or consisting of three grains or more grains in an oligocrystalline or polycrystalline arrangement, can be obtained by the spray drying process.

Once the ceramic particles are produced, they can be employed in any suitable manner for a given application. The ceramic particles can be employed as an aggregate population of loose ceramic particles, as an aggregate population of ceramic particles contained in a vessel or other structure, as an aggregate population of ceramic particles arranged in a selected three-dimensional shape, as ceramic particles disposed as a layer of particles on a surface, e.g., as a surface layer or a layer in between other layers, or other configuration of a population of ceramic particles. In all of these cases, the aggregate population of particles forms a shape memory ceramic structure. Where it is desired to employ the ceramic particles as an aggregate population of particles arranged in an aggregated bulk form of a structure, such as that shown in FIGS. 3A-B, a population of the ceramic particles can be pressed together into a selected form, such as a cubic or cylindrical shape, by a selected pressure, e.g., between about 1 MPa and about 10 MPa, using, e.g., a conventional hydraulic press machine. To render a resulting ceramic particle compact easy to handle, a polymer binder, such as polyvinyl alcohol (PVA), epoxy, polyurea, polyurethane, polyethylene, or polycarbonate can be added into the population of ceramic particles before pressing. For spherical particles or hollow spherical particles, the ceramic particles can be assembled into an ordered structure first and then polymer binders infiltrated into the gaps in between the ceramic particles to bind them into a powder compact.

A compact of an aggregate population of ceramic particles can be wrapped by one or more high-strength fabrics such carbon fabrics, Kevlar fabrics, glass fabrics and carbon nanotube (CNT) twisted fiber fabrics. The fabrics can be formed of one or a few different fibers, such as carbon/Kevlar or carbon/glass fabrics. A ceramic particle compact can also be wrapped by a three-dimensional woven fiber preform or other fabric. After wrapping a particle compact with a fabric, one or more polymer binders such as epoxy can be applied to the fabric to bond the fabric with the particle compact. A few layers of fabric and polymer binders can be applied in an alternating sequence to build up a structure with a required characteristic, e.g., to achieve a structure with an overall tensile/compressive strength of the coatings of at least 100 MPa. To enable a fabric length to be attached to a compact of ceramic particles strongly and evenly, cold isostatic pressing or hot pressing can be carried out on the whole sample during the binding of fabrics to a compact of particles.

A ceramic particle compact can also be covered with a layer of metallic coating. Many metals and alloys such as steel, aluminum alloy, magnesium alloys, copper, brass, titanium alloys and titanium-nickel alloys can be used for this purpose. The metallic coatings can be applied by dip coating from the metallic melting liquids and then cooled.

A compact of ceramic particles can be arranged into a composite structure, e.g., including shape memory ceramic particles as filler and a polymer or metal as the composite matrix. Herein, such a polymer matrix material can be supplied as, e.g., a high-molecular-weight polycarbonate, epoxy, polyuria, polyvinyl chloride, polypropylenes, polyethylene, polyester, acrylic, or nylon. A metal matrix material can be supplied as, e.g., aluminum, magnesium, steel, titanium or an alloy. To enhance the mechanical strength of matrix materials, fibers can be added into the matrix. Such fibers can be supplied as, e.g., carbon fibers, Kevlar fibers, glass fibers, carbon nanotube (CNT) twisted fibers, graphene twisted fibers, or other suitable fiber.

EXPERIMENTAL EXAMPLES

A series of different populations of SMC particles were fabricated with a ceramic particle size ranging between about 1 μm and about 5 μm, and were tested for their mechanical response under compressive loads. Through testing of tens of SMC oligocrystal and single crystal particles, it was demonstrated that completely recoverable superelastic behavior is achievable in the SMC articles for more than one hundred loading-unloading cycles.

The populations of particles were formed with a composition of 16% Ce—$ZrO_2$ and an average grain size of about 1.7 μm by a spray drying method and were sintered at a temperature of 1500° C. for 2 hours. This process transformed an aqueous slurry into dry spherical ceramic powders by spraying the slurry into a hot drying medium. First, polyvinyl alcohol (PVA) binder with molecular weight of ~35,000 was dissolved in hot water at a temperature of about 90° C. After cooling the solution, the commercial dispersant Darvan C—N, Vanderbilt Minerals, LLC, Norwalk, Conn., was added, followed by adding the ceramic powders $ZrO_2$ and $CeO_2$. The aqueous slurry was then mixed by ball milling for more than 24 hours. The obtained slurry consisted of ~2 wt % of PVA, ~2 wt % of Darvan C—N, ~30 wt % ceramic powder and the rest was water.

A Büchi Mini Spray Dryer B-290 with the nozzle tip diameter of 0.7 mm was then employed for spray drying. Compressed air with a pressure of 100 Psi was used as a drying medium. The spray dryer inlet temperature was maintained at 135° C. and the feeding rate was ~30 ml/hr. The resulting ceramic particles were then sintered at 1500° C. for 2 hours in air. The sintered particles were then dispersed in ethanol and ultrasonically processed for about one minute. The slurry was then drop coated on a quartz substrate and dried at room temperature. The morphology of the particles was then observed by FESEM with a FEI Nova 600i Nanolab, FEI, Hillsboro, Oreg. For those particles of interest, a circle with diameter of 20 μm was marked by a Focus ion beam (FIB) milling system using the FEI Nova 600i Nanolab. Each circle was centered at one particle only and there were no other particles surrounding. This ensured that a compression test could be conducted on a single particle.

The SMC particle material exhibited pure tetragonal phase (austenite) at room temperature, confirmed from X-ray diffraction by the XRD pattern. Selected area electron diffraction (SAED) patterns were taken on a number of particles and demonstrated that the particles were purely tetragonal phase. Their austenite and martensite finish temperature was estimated to be $A_f=\sim 0°$ C. and $M_f=\sim -170°$ C. These particles are suitable for superelasticity studies because at room temperature, they lie at a temperature above austenite finish temperatures; thus, deformation at room temperature can induce shape change via transformation to martensite, which can be subsequently recovered upon withdrawal of stress, as the austenite phase is more thermodynamically stable at room temperature. Only those particles with spherical or near spherical shapes were selected for study for easy comparison between different particles. Compared with SMC pillars with an aspect ratio of about 2-4, the spherical, particles have lower aspect ratio, only ~1. This can make the measured data more reliable as spherical particles have much lower chance of undergoing buckling. Furthermore, because there is no machining of the particles, they have pristine grain boundaries. This enables the visualization of grains in each particle to be very straight forward.

Particles for testing were those having a diameter of between about 1 μm and about 5 μm, including polycrystalline particles, having about 10 grains, oligocrystalline particles, having between about 2 and about 5 grains, and single crystal, or monocrystalline particles, having only one grain. Tens of each type of ceramic particle were uniaxially compressed using a Hysitron nanoindenter equipped with a flat diamond punch of 10 μm in diameter.

Eighteen particles including different numbers of grains were first tested to identify the number of grains per particle that results in optimal superelastic properties. Then cyclic loading was applied to the particles to understand their cyclic response. Micro-compression tests on the SMC particles were carried out on a Hysitron Triboindenter TI 950, Hysitron, Minneapolis, Minn., equipped with a 60° conical tip with a flat end having a diameter of 10 μm. The tip was carefully aligned on a selected particle using an optical scope and referring to the center of the circle marked around the particle. The loads applied were in the range of between about 0.5 mN and about 10 mN and the loading rate was about 50 μN/s.

To perform the test over hundreds of cycles in a reproducible and comparable way, the tests were separated into tens of test segments in which 10 identical loading and unloading cycles were conducted with a Specified maximum load and a constant loading rate. Between the segments, a set-point 2 μN contact force was always maintained and the contact with the specimen under test was never broken.

Load-displacement curves of data were plotted with the test results, and based on the load-displacement curves, the maximum stress, the maximum strain, and the average total damping energy was evaluated for each particle. The stress was calculated by using the maximum load divided by the cross-section area of a particle; the strain was calculated by using the maximum displacement divided by the diameter of a particle, and the dissipated energy in each superelastic cycle was calculated as the area enclosed by the hysteresis loop in the load-displacement curve divided by the particle volume.

FIGS. 8A-8C shows three exemplary particles tested. Particle #1 in FIG. 8A had a diameter of 4.2 μm. It is an example of a polycrystalline structure, having more than 10 grains. During testing, the compressive load applied to this particle was gradually increased up to 3.5 mN; however, only elastic deformation was observed. When further increasing the load, the particle started to develop plastic strain and was crushed at a load of 4.79 mN. This behavior is shown in the plot of FIG. 8D. The crushing load under which there is a sudden large increase of the displacement and an associated decrease of force is the so-called crushing load, $F_{crushing}$. According to the crushing load, the particle compressive strength was estimated to be about 0.35 GPa.

Particle #2, shown in FIG. 8B, had a diameter of 3.5 μm, and included about 5-6 grains in total. The structure of this particle was oligocrystalline, having more surface area than grain boundary area. An axial compressive load of 6.0 mN was applied to the particle and the load-displacement curve measured, as shown in the plot of FIG. 8E. A few small displacement plateaus with total displacement of about 10 nm were observed (pointed by two arrows), after which the particle was unloaded and exhibited perfect recovery. The particle thereby exhibited the superelastic effect. The two displacement plateaus in the loading curve can be attributed to the strain associated with the stress-induced martensitic transformation and the motion of austenite-martensite interfaces, while the two small steps of change in the unloading curve (pointed by another two arrows) can arise from the recovery of the initial austenite phase via reverse martensitic transformation). Based on the load-displacement curves, the transformation strain was determined to be only ~0.3% and the dissipated energy for one superelastic cycle was estimated to be ~4.2 MJ/m$^3$.

Particle #3, as shown in FIG. 8C, was a single crystal particle of 1.3 μm in diameter. When a compression cycle with maximum load of 2.5 mN was applied, particle #3 exhibited a typical superelastic load-displacement characteristic, as shown in the curve of FIG. 8F, in which a large displacement burst of about 30 nm was observed in the loading curve and also the unloading curve (pointed by arrows). This is indicative of a perfect shape recovery of the single crystal particle. According to displacement plateau in FIG. 8F, the transformation strain during the superelastic cycle was estimated to be about 2.3% and it occurred in a very short time of about 12 ms. The dissipated energy was estimated to be about 38.3 MJ/m$^3$. This much higher dissipated energy than that of Particle #2 is understood to result from the fact that the particle 3# has a much larger transformation strain.

The results presented above are typical of many experiments conducted, and clearly show that crystal structure plays a critical role in the superelastic properties of SMC particles provided herein. Polycrystalline particles fail to exhibit superelasticity, tend to develop plastic deformation, mainly as cracks, and subsequently can be crushed if the compressive load is increased continuously. This failure behavior is similar to bulk polycrystalline ceramics. The fractures start from grain boundaries due to the concentration of mismatch stress, as evidenced by FIG. 9A, showing the polycrystalline particle #1 after crushing. Very prominent cracks can be found along the grain boundaries and triple junctions (pointed by arrows). As a result, the compressive strengths of such polycrystalline particles are very low, varying between about 0.25 GPa and about 0.5 GPa as shown in FIG. 9B.

Figure 10B:
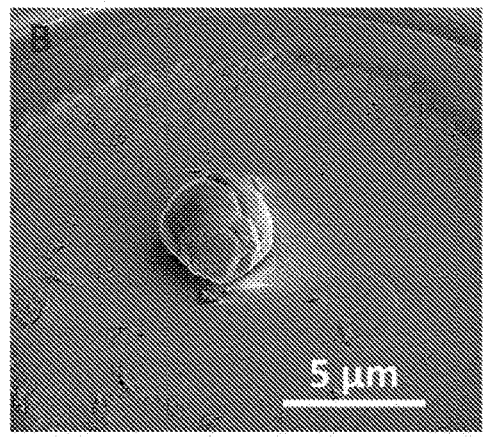
FIG. 10B is a micrograph of the particle of FIG. 8B after eleven loading cycles.

Without being bound to theory, it is understood herein that the oligocrystalline SMC particles provided herein can repeatedly and fully sustain superelastic cycling largely because the transformation mismatch internal to the particle is significantly reduced over that of polycrystalline particles. Compared with polycrystalline particles, the oligocrystalline particles have far fewer grain junctions and more stress-relieving free surface area, both of which decrease the geometrical constraints that lead to crack formation. Thus the oligocrystalline SMC particles were demonstrated to fully recover strain during unloading and to go through tens of cycles of superelasticity while remaining almost perfectly intact. This is demonstrated in FIGS. 10A-10B. However, because the martensitic transformation in different grains are anisotropic, the overall transformation strains measurable by nanoindenter are very small, about 0.3%, and the dissipated energy for one cycle of loading-unloading is only between about 4 MJ/m$^3$ and 10 MJ/m$^3$.

Single crystal SMC particles have no grain boundaries and no constraint from surrounding grains, enabling single crystal SMC particles to exhibit high compressive strength, as evidenced by the one-time compression tests of many particles to failure. The particle strengths were measured to be in the range of between about 0.5 GPa and about 1.5 GPa, highly depending on the crystal orientation, as evidenced by FIG. 9B. As a result, single crystal SMC particles are determined to be very robust in martensitic transformation and can be preferred for many applications. In many cases, they have very clean one-step martensitic transformation, resulting in a large strain which can be perfectly recovered via reverse martensitic transformation. The transformation strains are scattered in the range of between about 1% and about 3.5%. The superelastic cycling was carried out for over one hundred times without developing plastic strain.

Particle #3 is a good demonstration of the superelasticity in single crystal particles. The superelasticity cycling was operated under a compressive stress up to 1.88 GPa, which is much higher than the ultimate strengths of many other energy-damping materials such as shape memory alloys (<0.5 GPa) rubbers (~5 MPa), and polymers (<0.1 GPa). Due to the large transformation stress and strain for single crystal particles, the energy dissipated by a complete superelastic cycle per unit volume is between about 20 MJ/m$^3$ and about 40 MJ/m$^3$, higher than that of the aforementioned oligocrystalline particles as well as shape memory alloys such as Ni—Ti. Cu—Al—Mn—Ni and Ni—Ti—Nb alloys, which have energy dissipation of between about 10 MJ/m$^3$ and about 20 MJ/m$^3$.

Figure 11A:
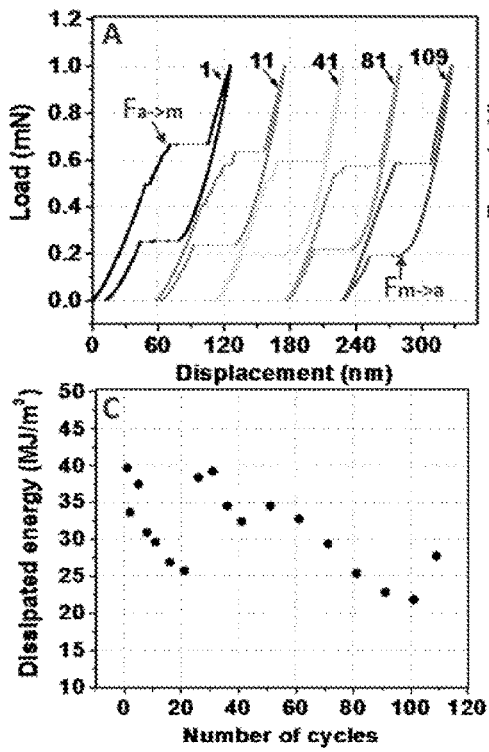
FIG. 11A is a plot of the load-displacement characteristic of a single crystal shape memory ceramic particle over 109 loading cycles.

FIG. 11A shows the cyclic compression results for a representative single crystalline particle, #4, produced as given above and having a diameter of about 1.2 µm. For the first cycle of compression, two steps of displacement plateaus associated with stress-induced martensitic transformation can be observed in the loading curve. The first step with 3 nm displacement was induced by the nucleation of the martensite variants at a low load of 0.49 mN, while the second step, one spanning 33 nm in width at 2.75% strain, was due to the burst of martensite formation at 0.6 mN. In the unloading curve, there is also seen to be a displacement plateau of 38 nm at a load of 0.28 mN. This is responsible for the reverse martensitic transformation, leading to the full recovery of the transformation strain.

The two-step displacement plateaus become 3-4 tiny steps and one large step in the subsequent 2-30 cycles of the loading-unloading curves, indicating that more martensite nucleants are triggered, as shown in a representative curve of the 11$^{th}$ cycle in FIG. 11A. Starting from the 31$^{st}$ cycle, the displacement plateaus become two again. The total displacement increases to about 45 nm at a 3.8% transformation strain. This indicates that different martensite variants have grown and merged into two domains. Once this new configuration of martensitic domains become stable, the cycle shape doesn't evolve further, as evidenced by the three highly superimposed superelastic cycles, cycles 41, 81, and 109, plotted in FIG. 11A.

Figure 11B:
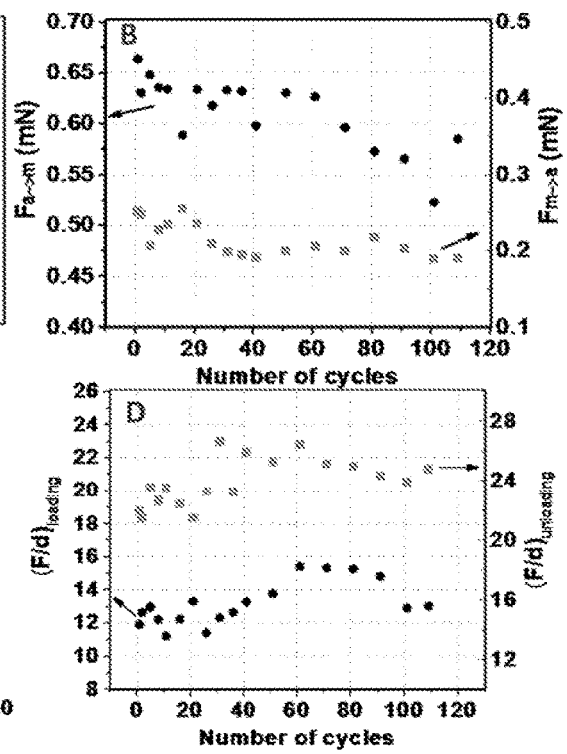
FIG. 11B is a plot of the critical load for inducing martensitic transformation and reverse martensitic transformation for the particle of the plot of FIG. 11A, as a function of number of loading cycles.

Another outstanding observation with regard to the plot of FIG. 11A is that the critical loads for inducing martensitic transformation (Austenite→martensite, denoted as $F_{a \to m}$) and reverse martensitic transformation (martensite→austenite, denoted as $F_{m \to a}$) for the single crystal SMC particle are decreased with continued cycling of the applied load, as has been summarized in FIG. 11B. Noted here are the critical loads initiating the largest displacement plateau. This decreasing tendency is more pronounced in the first 20 cycles and 60$^{th}$-100$^{th}$ cycles for $F_{a \to m}$ and in 20$^{th}$-40$^{th}$ cycles for $F_{m \to a}$. Comparatively, the changes in the $F_{a \to m}$ was more significant than the $F_{m \to a}$. It was decreased from 0.67 mN to ~0.55 mN, while the latter only from 0.25 nN to 0.20 mN. This effect can be attributed to the generation of dislocations along the compressive stress field which accommodate the martensite plates in the austenite matrix and thus forming an easy path that favors the martensite nucleation and growth. As a consequence, martensite domains can evolve at lower stresses in the subsequent loading cycles.

One more striking phenomenon associated with the repeated cycling of a single crystal SMC particle is the reduction of the area inside the superelastic loop, which is proportional to the energy dissipated per cycle of loading-unloading. A quantitative analysis of the dissipated energy as a function of the cycling numbers is illustrated in the plot of FIG. 11C. The dissipated energy at the first 20 cycles is remarkably reduced from about 40 MJ/m$^3$ to about 25 MJ/m$^3$ as the critical load for martensitic transformation ($F_{a \to m}$) was decreased in the first 20 cycles and the critical load for reverse martensitic transformation ($F_{m \to a}$) was almost constant. From twentieth to the thirtieth cycles, the dissipated energy was suddenly increased. This can be responsible for the reduction of the $F_{m \to a}$, causing the increase of the area inside the superelastic loop. After thirtieth cycle, the dissipated energy was continuously decreased, following similar trend as the $F_{a \to m}$.

Figure 12A:
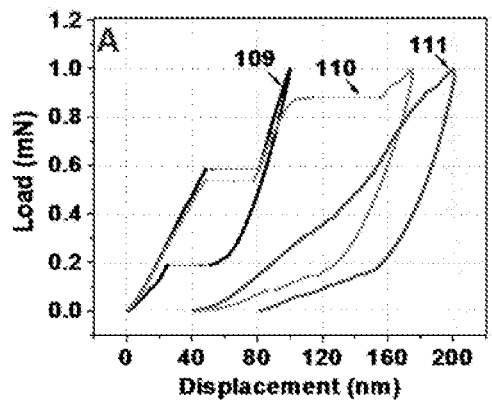
FIG. 12A is a plot of the load-displacement characteristic of a shape memory ceramic particle for the 109, 110, and 111 loading cycles.
Figure 12B:
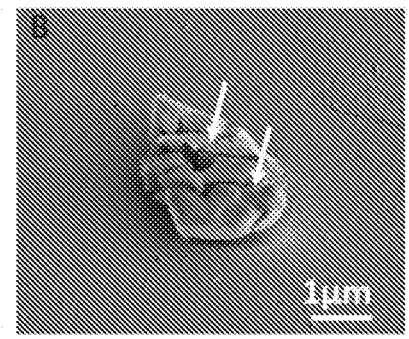
FIG. 12B is a micrograph of the particle of the plot of FIG. 12A after crushing.

With continuous cycling, SMC particles eventually exhibit fatigue behavior similar to that of shape memory alloys. More than 10 particles were cycled to failure under uniaxial compression loading to analyze this condition. Most of the particles demonstrated a fatigue life of between about 50 cycles and about 100 cycles. The single crystalline particle #4 described above demonstrated a fatigue life of 109 cycles, with plastic strain developing from the 110th cycle on as shown in FIG. 12A. It is interesting to observe that the plastic deformation didn't occur at the critical load for martensitic transformation ($F_{a \to m}$, 0.55 mN), but at a much higher level (~0.87 mN), indicating it is not directly induced by martensitic transformation, but something else. Similar phenomena have also been found in the other particles. For the aforementioned particle #3, the plastic deformation was developed at the maximum load of 2.5 mN, while the critical load ($F_{a \to m}$) is ~0.75 mN. The particles are crushed if the cyclic compression continued after the plastic deformation has occurred. FIG. 12B shows one particle after crushing. A few cracks can be observed along the direction of compression loading (pointed by arrows).

In shape memory ceramics, deformation involves the nucleation of martensite variants and the movement of austenite/martensite interfaces, and the latter have the most dramatic effect on particle fatigue life, as it generates most significant strain. If the stress field is not uniform, for example in particles, the movement of austenite/martensite interfaces will not be commensurate. The shearing of the martensite lattice planes can cause dense dislocations and large internal stress. Once the internal stress Increases over the damage threshold of the particles with continuous cycling, it will eventually cause the fracture failure. As a result, for many applications, it can be preferred to employ a particle geometry that enforces a uniform stress field internal to the particle. A regular geometry, or symmetric particle geometry, can therefore be preferred as explained above.

To better understand the microstructure evolution of the shape memory particles under cyclic compression loadings, TEM analysis was carried out on a representative single crystal particle, #5, after superelastic cycling for 16 times, with a JEOL 2100F. The TEM sample was prepared using an in situ lift-out technique in the FIB milling system. Very clear and dense dislocations were observed in the contact area beneath the flat diamond punch and along the compression direction. However, more than 60% of the area out of the compression direction was almost intact. As dislocations are responsible for the stress-induced movement of austenite/martensite interfaces, the dislocation patterns exactly reflect the stress field distributed in the particle under compressive loads. The TEM analysis determined that the stress field was not entirely uniform. The highest stress was mainly distributed in the area contacting with the diamond punch and the substrate which therefore became the sites for the first fracture event to appear.

Figure 13A:
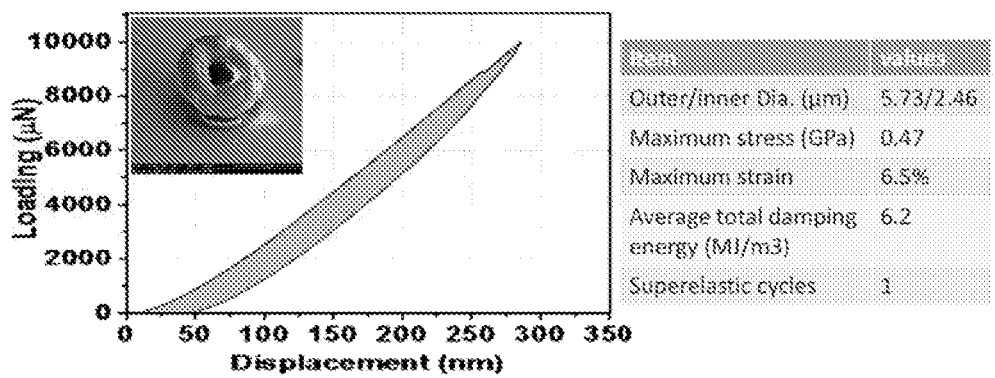
FIGS. 13A-13B are plots of the load-displacement characteristic of a first shape memory ceramic particle as shown and a second shape memory ceramic particle having a smaller diameter, as shown, respectively, with the characteristics of the particles given adjacent to the plots.
Figure 13B:
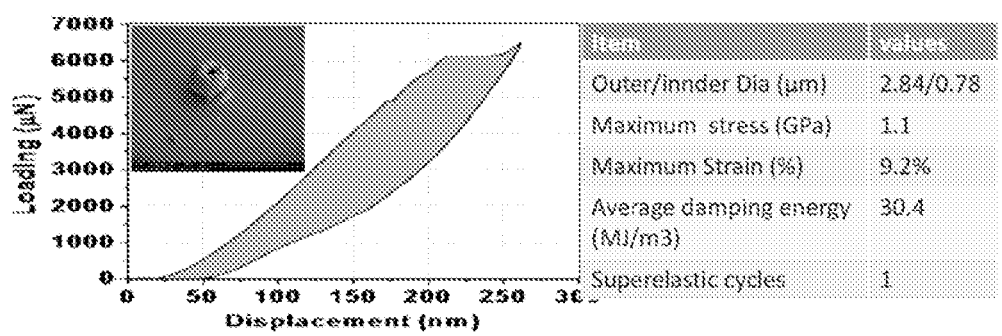

Hollow ceramic particles like that of FIGS. 7A-7C were tested for their characteristics. In FIGS. 13A-13B, there is shown for two of the particles the morphology, loading-displacement curves, dimension, stress, strain and average total damping energy. Compared with the particle of FIG. 13A, the particle of FIG. 13B has much smaller diameter and volume. The particle of FIG. 13B consists of only 4 grains and hence has a much larger free surface area. This particle exhibited very active martensitic transformation under compression, leading to a few large strain plateaus in the loading-displacement curve. The particle could be compressed up to 9.2% strain and the strain was almost fully recovered after unloading. The average total damping energy reached up to 30.4 $MJ/m^3$. Both the strain and the damping energy are seen to be much higher than that of the particle of FIG. 13A, which are only 6.5% and 6.2 $MJ/m^3$.

Figure 14:
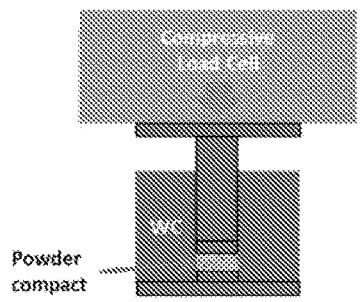
FIG. 14 is a schematic view of a set up for a WC die in a compression test of a ceramic powder compact.

The energy dissipation characteristics of a SMC particle compact as provided herein was evaluated by confining the particles in a tungsten carbide (WC) die and then compressed by a mechanical tester (Instron, 5569) a shown in FIG. 14. The energy dissipation et two batches of 16 mol % Ce—$ZrO_2$ particles prepared by the modified solid state sintering and by spray drying with PVA35k was compared. To perform the compression, 0.1 gram of the particles were introduced into the die and then a pre-loading of 1 kN was applied before the test to densify the particles into a compact. The compact was then compressed for twenty cycles at different loads to study its energy dissipation behavior. The applied loads were 9.8 kN, 12.6 kN, 19 kN and 25.2 kN, which correspond to stresses of 0.75 GPa, 1 GPa, 1.5 GPa and 2 GPa, respectively.

Figure 15A:
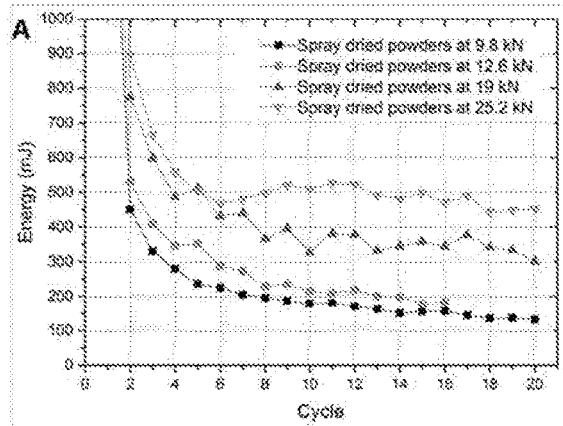
FIGS. 15A-15B are plots of dissipated energy as a function of loading cycle of ceramic powder compacts at compressive loads of 9.9 kN, 12/6 kN, 19 kN, and 25.2 kN for a spray a dried ceramic powder compact and for a solid state sintered ceramic powder compact, respectively.
Figure 15B:
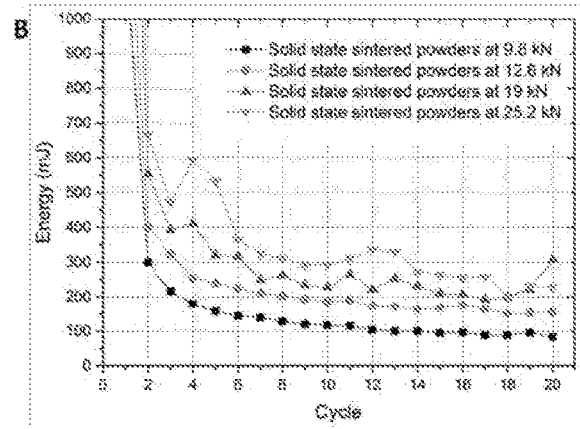

The dissipated energy of each particle compact was calculated by measuring the area enclosed in the load-displacement curves. It should be noted that the displacement data have been subtracted by the displacements of the empty WC die at the same load. This is to eliminate the contribution of WC die to the dissipated energy due to its elastic deformation. FIGS. 15A-15B show the results. Generally, the dissipated energy decreases with the cycling at the first few cycles and then tend to stabilize and become repeatable after 10 cycles. This repeatable dissipated energy results from the superelasticity of the SMC powders. From FIGS. 15A-15B, it is also observed that the dissipated energy varies significantly with the compressive loads. A higher dissipated energy is observed at higher compressive loads for both spray dried and solid state sintered powder compacts.

Figure 16:
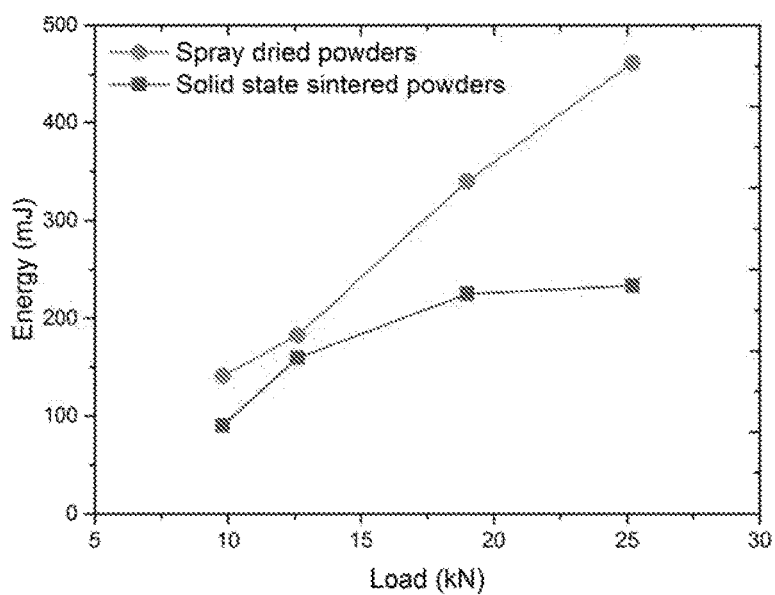
FIG. 16 is a plot of dissipated energy as a function of load for a spray dried ceramic powder compact and for a solid state sintered ceramic powder compact.

FIG. 16 shows the plot of the dissipated energy, averaged from the sixteenth to the twentieth cycles of compression, vs. applied compressive load, for spray dried ceramic particles and for sintered ceramic powders. It can be observed that at the same load, the spray dried powders always dissipated more energy than that of solid state sintered powders. With an increase in the compressive load, the dissipated energy of the spray dried powder compact linearly increased from 141.3 mJ at 9.8 kN (0.75 GPa) and reached about 461.5 mJ at 25.2 kN (2.0 GPa). By normalizing the energy by the volume of the powder compact (16.15 $mm^3$), the specific dissipated energy is found to vary between about 7.0 $MJ/m^3$ and about 28.5 $MJ/m^3$. This is much higher than that of many other energy damping materials, e.g., about 1 $MJ/m^3$·10 $MJ/m^3$ for shape memory alloys, about 0.3 $MJ/m^3$·1.5 $MJ/m^3$ for aluminum foams, and about 0.5 $MJ/m^3$-0.9 $MJ/m^3$ for polymers foams.

For solid state sintered ceramic powder, the dissipated energy was found to increase with load in the range of 9.8 kN to 12.6 kN, while the increment was significantly reduced when the load increases to 19 kN to 25.2 kN. The dissipated energy at 25.2 kN was only about 233.5 mJ. The compressive loads of 19-25.2 kN may have been too high for this kind of particle and therefore caused infra-granular particle crushing, causing formation of high-density dislocations. These structural defects hinder the occurrence of martensitic transformation. Therefore only those particles that are strong enough to withstand a relatively high load can contribute to the energy dissipation, while the quantity of these particles are decreased with higher load. As a result, a decrease of the population of effective particles and an increase in dissipated energy per particle with load increasing are competing phenomena, leading to the saturation of the overall dissipated energy at higher load, at between 19 kN and 25.2 kN.

Through dozens of compression tests on the SMC particle compact, it was found that the particle shape and particle size, as well as the load conditions, including cycling and loads, all play an important role in the energy dissipation capacity of a SMC particle. Of all, the compressive load is the most crucial as it determines whether the energy dissipation is contributed by superelasticity or particle crushing, and changes the dissipated energy most significantly. Particle shape is second most important parameter. Spherical or near-spherical particles exhibit about two times higher energy dissipation, compared with the irregularly-shaped particles. Particles with relatively smaller sizes, e.g., between about 1 µm and about 10 µm in diameter, can dissipate more energy than relatively courser particles having larger diameters, e.g., between about 10 µm and about 25 µm.

Compared to shape memory metal alloys such as NiTi, CuAlMn, and FeNiCoAl, the shape memory ceramic $(ZrO_2)_{1-x}(CeO_2)_x$ has a much higher transformation stress, a much larger hysteresis in a load-unload cycle, and a tunable transformation temperature as high as 1000° C. These properties render this shape memory ceramic ideal for a wide variety of emerging applications for energy dissipation and high temperature actuation. In particular, manufacturing of this shape memory ceramic into granular particle form provides an effective approach to high energy dissipation and vibration damping, in which the waste mechanical energy is converted to heat through reversible stress-induced martensitic transformation in individual particles, as well as through the initial densification, fracture and internal friction of microscale particles.

The mechanical and thermal responses of particles of the shape memory ceramic $(ZrO_2)_{1-x}$—$(CeO_2)_x$ were investigated for with three different compositions, namely, x=10%, 12%, and 13.2%. At room temperature, these three compositions correspond to the detwinning regime, intermediate regime, and superelastic regime, respectively. The shape memory ceramics were synthesized by chemical co-precipitation of two salts, $Ce(NO_3)_3 \cdot 6H_2O$ and $ZrOCl_2 \cdot 8H_2O$, with ammonium hydroxide, followed by drying, infiltration, and calcination at 1500° C. The as-synthesized samples were then ground into microscale powders, with a particle size in the range of 45-150 μm, and a grain size of 5-10 μm. The mechanical behavior of granular shape memory ceramics was tested and measured through die powder compaction using a steel die and an Instron mechanical test system. Such confined uniaxial compression converted loose powder into a weakly-bonded compacted pellet of an aggregate of powder particles.

For the $(ZrO_2)_{1-x}$—$(CeO_2)_x$ alloy with x=10%, the as-prepared loose powders were of monoclinic phase (i.e. martensite, $M_f$>300K). Confined uniaxial compression with an average axial stress of 880 MPa lead to a compacted pellet with a fiber texture. The majority of the grains in the pellet had the same out-of-plane crystallographic orientation (hkl), whereas the in-plane crystallographic orientations were random. The normal of (hkl) plane was close to the normal direction of (111) plane, and formed an angle ~40-55° with the normal direction of (002) plane. This detwinning texture possibly originates from the alignment of (002) twinning plane of monoclinic phase with the direction of maximum shear stress.

The textured pellet transforms from monoclinic phase to tetragonal phase as it is heated up from room temperature to 500° C. For the first cycle, however, there were no clear endothermic peaks associated with $A_s$ and $A_f$ in the DSC curves. The tetragonal pellet transforms back to monoclinic phase as it cools down back to room temperature, with clear exothermic peaks associated with $M_s$ and $M_f$ in the DSC curves. For the second cycle, both endothermic and exothermic peaks were clearly visible in the DSC curves, corresponding to $M_s$~210° C., $M_f$~150° C., $A_s$~380° C., and $A_f$~430° C., similar to those observed in the DSC measurement for loose powders of the same composition. The changes from abnormal to normal behaviors in DSC curves were probably caused by the loss of texture in the monoclinic pellet as it transformed from tetragonal phase.

For $(ZrO_2)_{1-x}$—$(CeO_2)_x$ alloy with x=12%, the as-prepared loose powders were of tetragonal phase, i.e., austenite. Confined uniaxial compression with an average axial stress of 880 MPa resulted in transformation of the majority of the powders to the monoclinic phase. However, as the load was removed, the monoclinic phase did not transform, back to tetragonal phase. In other words, in this intermediate regime ($M_s$<300K<$A_s$), the stress-induced martensitic transformation is irreversible. This discovery provides direct evidence for stress-induced transformation in granular, particulate shape memory ceramics under conditions of confined uniaxial compression. The resultant compacted pellet consisted of a majority of monoclinic phase and a minority of the residual tetragonal phase. For the monoclinic phase within the compacted pellet, a fiber texture was observed, which is similar to that found in the detwinning regime with x=10%. This transformation texture possibly originated from the alignment of (002) twinning plane of monoclinic phase with the maximum shear stress direction following stress-induced martensitic transformation. There was no texture associated with the residual tetragonal phase after confined uniaxial compression in the pellet.

When heated up to 500° C., the monoclinic textured pellet transformed to the tetragonal phase, without clear endothermic peaks associated with $A_s$ and $A_f$ in the DSC curves. As cooling down back to room temperature, no martensitic transformation occurred and the pellet stayed in the tetragonal phase. This is because the martensite start temperature is below room temperature. The first DSC cycle from room temperature to 500° C. and back to room temperature, therefore, converted the metastable monoclinic phase that is caused by stress to the tetragonal phase. In following DSC cycles, the pellet stayed in the tetragonal phase, without forward or reverse martensitic transformations. The force-displacement curve of the pellet shows that a significant proportion of the strain caused by confined uniaxial compression is not recovered upon unloading. This observation is consistent with irreversible stress-induced martensitic transformations, which are concluded from X-ray diffraction (XRD) and differential scanning calorimetry (DSC) characterizations.

The intermediate regime ($M_s$<300K<$A_s$) enables particle response control by loading conditions and materials structures as a function of stress-induced martensitic transformations. These experiments show that for the same particle size, stress-induced martensitic transformation is favored in granular shape memory ceramics with larger grain sizes.

For $(ZrO_2)_{1-x}$—$(CeO_2)_x$ alloy with x=13.2%, the as-prepared loose powders were of tetragonal phase (i.e. austenite). Confined uniaxial compression lead to forward transformation of the powders to the monoclinic phase, while upon unloading the pellet underwent reverse transformation back to the tetragonal phase. In this superelastic regime ($A_f$<300K), it is difficult to identify the transformed volume fraction during loading through ex situ XRD and DSC characterizations. However, the force-displacement curve of the pellet showed that most of the strain during confined uniaxial compression was recovered upon unloading. This observation supports the idea of reversible stress-induced martensitic transformation.

With this experimental example, through the DSC and XRD characterizations as well as the mechanical testing, the mechanical and thermal responses of granular shape memory ceramics in the three different regimes were all well-characterized. In the detwinning regime, confined uniaxial compression leads to texture development in the monoclinic phase. In the intermediate regime and superelastic regime, confined uniaxial compression leads to transformation from tetragonal phase to monoclinic phase, simultaneously with the texture development in the monoclinic phase. For the textured monoclinic pellet in these cases, no clear endothermic and exothermic peaks are visible in DSC measurement. These results show that both the shape memory effect and superelastic effect are present in granular shape memory ceramics particles and particle aggregates, demonstrating the ability of these materials for energy dissipation and vibration damping.

With the description and experimental examples above, it is demonstrated that the shape memory ceramic particles provided herein provide a new type of superelastic material structure with many advantages over conventional energy-damping materials such as rubbers, fiber-reinforced composites, and foams. The advantages include very high energy damping, capability, high mechanical strength and especially compression strength, large recoverable strain, light weight, high temperature stability, and chemical stability. Bulk aggregations of shape memory ceramic particles, such as compacts of populations of the shape memory ceramic particles, are directly applicable for use in enabling, e.g., true multi-hitting capability in ceramic based armor systems, which conventionally crack after one or a few shots of bullets. A shape memory ceramic particle compact can therefore be used as an energy damping layer in various armor systems, including flexible armor systems, to protect soldiers and military vehicles from shocks and impact with, e.g., carbon or Kevlar fiber composite encapsulation of an aggregation of SMC particles.

The superelastic particles further can be used as a protective layer or sub-skin in various sports or protective equipment. For example, a SMC particle compact encapsulated in a carbon or Kevlar fiber composite can be fashioned into flexible body armor. A SMC particle compact is particularly well-suited for energy damping/absorbance in a crash box or vibration isolation systems for automotive vehicles, for aircraft, for aerospace vehicles, and for equipment mounting and buildings, protecting against shocks and collisions. The SMC powder compact enhances the energy damping and energy absorbance efficiency of such systems. The superelastic particles can be used as energy absorbing fillers in structural components, forming composite structures or panels for engineer mounts, bushings, and the like, and as vibration isolation systems, shock isolators for mounting high-precision equipment, buildings, bridges, and other civil engineering structures.

The solid state sintering method and the spray drying method provided herein to produce the shape memory ceramic particles are highly reliable and repeatable, scalable to large-scale production, efficient, and cost-effective. It is easy to control the grain sizes of the particles in a wide range of grain sizes, e.g. tens of nanometers to a few micrometers, by simply tuning the sintering temperatures. Further, both the solid state sintering method and the spray drying method provided herein accommodate doping with different elements into ceramic particles by mixing the precursors.

The modified solid state sintering method to produce the ceramic particles is highly reliable and repeatable. It is easy to control the grain sizes of the particles in a wide range, e.g., tens of manometers to a few micrometers, by simply tuning the sintering temperatures. The particles are not agglomerated although they are formed by high temperature sintering. Comparatively, conventional sol-gel methods can produce particles with sizes in very narrow range, usually in the submicron to a few micrometer range, but the particles are very agglomerated when they are heated to crystallize. For both the modified solid state sintering method and the spray drying method, doping different elements into the ceramic particles is easy by just mixing the precursors. The methods to produce the super elastic particles are up-scalable, time-saving and cost-effective.

It is recognized, that those skilled in the art may make various modifications and additions to the embodiments described above without departing from the spirit and scope of the present contribution to the art. Accordingly, it is to be understood that the protection sought to be afforded hereby should be deemed to extend to the subject matter claims and all equivalents thereof fairly within the scope of the invention.

We claim:

1. A shape memory ceramic structure comprising:
an aggregate population of crystalline particles;
each crystalline particle in the population of crystalline particles comprising a shape memory ceramic particle material and having a crystalline particle extent between about 0.5 microns and about fifty microns; and
at least a portion of the population of crystalline particles having a crystalline structure selected from the group consisting of oligocrystalline structure including no more than five grains and monocrystalline structure having an extent that is no more than about 5 microns.

2. The shape memory ceramic structure of claim 1 wherein the shape memory ceramic material comprises an element selected from the group consisting of zirconium, cerium, and oxygen.

3. The shape memory ceramic structure of claim 1 wherein the shape memory ceramic material comprises $ZrO_2$.

4. The shape memory ceramic structure of claim 1 wherein the shape memory ceramic material comprises $ZrO_2$ doped with at least one dopant selected from the group consisting of Ce, Y, Ca, Mg, Ti, Ge, La, Pb, Nb, Ta, Mn.

5. The shape memory ceramic structure of claim 1 wherein the shape memory ceramic material comprises a shape memory ceramic material selected from the group consisting of $Al_2SiO_5$, $Ca_2SiO_4$, and $Mg_2SiO_4$.

6. The shape memory ceramic structure of claim 1 wherein each crystalline particle in the population of crystalline particles has a particle geometry selected from the group consisting of solid spherical, hollow spherical, tabular, equant, polyhedral, and hollow spherical with at least one pore geometries.

7. The shape memory ceramic structure of claim 1 wherein each crystalline particle in the population of crystalline particles has a particle geometry selected from the group consisting of cuboid, cubic, tetragonal, and trapezoidal geometries.

8. The shape memory ceramic structure of claim 1 wherein each crystalline particle in the population of crystalline particles has a particle geometry including a plurality of surface faces, with two of the surface faces being parallel to each other.

9. The shape memory ceramic structure of claim 1 wherein each crystalline particle in the population of crystalline particles has a symmetric polyhedral geometry.

10. The shape memory ceramic structure of claim 1 wherein each crystalline particle in the population of crystalline particles has a crystalline particle extent that is between about 1 micron and about 10 microns.

11. The shape memory ceramic structure of claim 1 wherein each crystalline particle in the population of crystalline particles has a crystalline particle extent that is no more than about 5 microns.

12. A shape memory ceramic structure comprising:
an aggregate population of crystalline particles;
each crystalline particle in the population of crystalline particles comprising a shape memory ceramic particle material and having a crystalline particle extent between about 0.5 microns and about fifty microns; and
each crystalline particle in the population of crystalline particles having a spherical geometry with a spherical particle diameter and an oligocrystalline structure having an average grain size, and wherein the spherical particle diameter is no more than about ten times the average grain size.

13. The shape memory ceramic structure of claim 1 wherein the population of crystalline particles is arranged as an aggregation of loose particles contained in a vessel.

14. The shape memory ceramic structure of claim 1 wherein the population of crystalline particles is arranged as a coating of crystalline particles on a surface.

15. The shape memory ceramic structure of claim 1 wherein the population of crystalline particles is arranged as a bulk compact comprising the population of crystalline particles and a polymer binder.

16. The shape memory ceramic structure of claim 1 wherein the population of crystalline particles is arranged as a bulk compact comprising the population of crystalline particles, the bulk compact being wrapped in a fabric.

17. A shape memory ceramic structure comprising:
an aggregate population of crystalline particles;
each crystalline particle in the population of crystalline particles comprising a shape memory ceramic particle material and having a crystalline particle extent between about 0.5 microns and about fifty microns;
at least a portion of the population of crystalline particles having a crystalline structure selected from the group consisting of oligocrystalline and monocrystalline; and
wherein the population of crystalline particles is arranged as a bulk compact comprising the population of crystalline particles, the bulk compact being coated with a layer of metal.

18. The shape memory ceramic structure of claim 1 wherein the population of crystalline particles is arranged in a bulk composite comprising the population of crystalline particles and a matrix material selected from the group consisting of polymer matrix and metal matrix.

19. The shape memory ceramic structure of claim 18 wherein the bulk composite further comprises fibers selected from the group consisting of carbon fibers, Kevlar fibers, glass fibers, carbon nanotube twisted fibers, and graphene twisted fibers.

20. The shape memory ceramic structure of claim 1 wherein the population of crystalline particles is arranged as a cubic bulk composite.

21. The shape memory ceramic structure of claim 1 wherein the population of crystalline particles is formed by spray drying a slurry including a shape memory ceramic particle powder and a polymer binder.

22. The shape memory ceramic structure of claim 21 wherein the polymer binder comprises polyvinyl alcohol with a molecular weight of about 35,000.

23. The shape memory ceramic structure of claim 21 wherein the spray drying is carried out at an inlet temperature between about 130° C. and about 160° C.

24. The shape memory ceramic structure of claim 1 wherein the population of crystalline particles is formed by sintering a mixture of the shape memory ceramic particle material powder and a polymer powder, with a weight percentage of the polymer powder to the shape memory ceramic powder in the mixture being between about 1 wt % and about 15 wt %.

25. The shape memory ceramic structure of claim 24 wherein the polymer powder comprises a powder of a polymer containing six-membered aromatic rings.

26. The shape memory ceramic structure of claim 24 wherein sintering comprises heating the mixture at a sintering temperature between about 1000° C. and about 1600° C.

27. The shape memory ceramic structure of claim 26 wherein sintering comprises ramping temperature of the mixture to the sintering temperature at a ramp rate of between about 5° C./min and about 20° C./min.

\* \* \* \* \*